Patented Oct. 10, 1944

2,360,192

UNITED STATES PATENT OFFICE 2,360,192

ADHESIVES COMPRISING THE REACTION PRODUCTS OF ISOCYANATES WITH ALKYLENE IMINES AND THE PROCESS OF USING THE SAME

Herbert Bestian, Frankfort-on-the-Main, and Eugen Bock, Krefeld-Uerdingen, Germany; vested in the Alien Property Custodian No Drawing. Application April 5, 1941, Serial No. 387,060. In Germany February 22, 1940

2 Claims. (Cl. 260—6)

The present invention relates to a process of adhesion and to adhesives for this purpose.

We have found that particularly stable bonds between the most diverse substances may be obtained by applying between the substances to be cemented and, thereupon, completely polymerizing compounds of the general formulae:

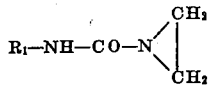

and

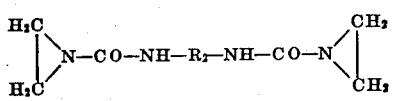

wherein $R_1$ stands for hydrogen or a univalent aliphatic or isocyclic radical and $R_2$ for a divalent aliphatic or isocyclic radical or the homologues or derivatives thereof or the products obtained by partial polymerization of these compounds. The compounds corresponding to the above formulae may be obtained by condensation of isocyanates with 1.2-alkylene-imines. There may be used, for instance, the monomeric compounds and the partially polymerized products thereof which are described in the co-pending applications Serial No. 322,031, now Patent No. 2,312,863, and Serial No. 322,032, now Patent No. 2,265,416, both filed March 2, 1940, in the name of Herbert Bestian, for "Polymerization products."

The mode of application of the adhesives depends upon the nature of the materials to be cemented. They may serve for the production of bonds in the monomeric state in case the surfaces of both substances to be cemented are not porous, for instance, two metal surfaces. Otherwise, there are advantageously used products obtained by partial polymerization which, owing to their high viscosity even in the heat, are not absorbed by the porous substances. For producing bonds by means of such products as are obtained by partial polymerization there are suitable those prepared in the fused state as well as those prepared with application of a solvent, such as, for instance, water or butanol. Also mixtures of two or more compounds of the above general formulae may be used in the monomeric or polymerized state. Furthermore, it is possible to add to the compounds softening agents, for instance, phthalic acid dibutylester, tributylphosphate, triphenylphosphate, octyl alcohol as well as extenders and known sticking or cementing agents such as wood dust, kaolin, diatomaceous earth, natural and artificial resins, cellulose derivatives, casein, albumin, glutin, vegetable flours such as potato starch, especially when made up into a paste, or the like. By addition of formaldehyde a substantial acceleration of the setting process is attained.

Two solid materials are preferably cemented by applying the adhesive in the monomeric or partially resinified state onto the surfaces to be united and by, thereupon, completely polymerizing the said substance by applying pressure and heat. The polymerization may be effected according to the conditions described in the two patents mentioned above.

The above ureas or their polymerization products are suitable for cementing wood, metal, glass, plastics, paper, fabric or the like as well as for uniting substances of different kind, for instance for uniting metal and glass, plastics and glass, wood and metal and so on.

The following examples serve to illustrate the invention but they are not intended to limit it thereto, the parts being by weight:

(1) Two aluminium sheets of 2 mm. thickness are well cleaned on the surfaces to be united. On both these surfaces a thin layer of a butanol solution of 50 per cent strength of the partially polymerized urea of the formula:

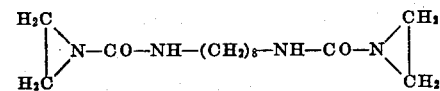

is applied. Thereupon, the said two surfaces are placed one upon the other, pressed together by weight and thereafter dried for 3 hours in a drying oven at 120° C. A very stable bond is obtained and the two surfaces are inseparable even at high temperatures.

The monomeric urea of the above formula is obtained by reaction of 1.8-octamethylene-diisocyanate with ethylene imine in acetone solution. The butanol solution of 50 per cent strength used as the adhesive is prepared by heating for 2–3 hours at 80° C. to 90° C. equal parts of the monomeric urea of the above constitution and of butanol.

(2) 80 parts of the urea of the following formula:

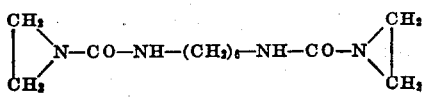

and 20 parts of the urea of the following formula:

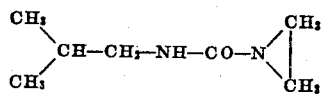

are heated for a short time at 110° C. until a clear melt has been formed. The temperature of the molten mass is then reduced to 80° C. and this temperature is maintained until the resinification of the urea mentioned in the first place has proceeded so that, on cooling it does not tend to crystallize. The subsequent heating takes about 1–2 hours. A viscous mass is obtained which is perfectly suitable for preparing cementations.

A glass rod of quadrangular cross section is coated on one of its longitudinal surfaces with the mass thus obtained, slightly pressed onto a glass plate and then heated in a drying oven for 2 hours at 120° C. A glass-clear bond of the two glass pieces is obtained which even by application of heat cannot be separated. By employing force, the glass breaks but the bond does not give way.

Both ureas of the above formulae are obtained by reaction of 1.6-hexamethylene-diisocyanate and isobutylisocyanate, respectively, with ethylene-imine.

(3) The urea obtained by reaction of 1.4-tetramethylene-diisocyanate with ethylene-imine and corresponding to the following formula:

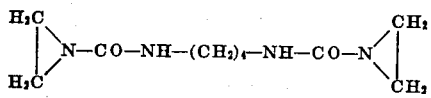

is strewn in the form of a powder on an aluminium sheet. A glass sheet is placed thereon, the two sheets are pressed together by a small weight and thereupon heated for 2 hours in a drying oven at 110° C. to 120° C. The glass adheres very firmly to the aluminium and cannot be detached even at raised temperature.

(4) A laminated panel of beech is prepared by coating a beech veneer of 2 mm. thickness on both sides with an aqueous solution of 50 per cent strength of a partially polymerized product of the formula:

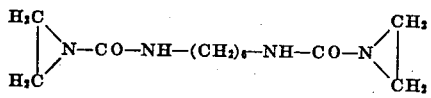

placing on both sides each a veneer not coated with the glueing agent in such a manner that the grains of the veneers are at right angles to the inner veneer coated with the glueing agent, placing the whole in a hydraulic press with plates having a temperature of 120° C. and maintaining it under pressure for 30 minutes. Thereafter, the individual veneers cannot be separated from each other. By violently tearing the plywood, the wood cracks but the bonds are not separated. They are also entirely stable against cold and hot water.

The partially polymerized product is obtained by stirring 1 part of the monomeric product according to the above formula with 1 part of water and heating to 90° C. to 100° C. After heating for about 13 minutes the polymerization is stopped by cooling. The viscous solution is used for glueing.

In case the solution of the partially polymerized product is not immediately used, it may be rendered stable by addition of ammonia. Instead of applying the liquid solution of the adhesive to the part to be glued, a fabric or paper may be impregnated therewith and the film thus prepared may be used.

(5) 78 parts of water are poured on 20 parts of casein (lactic-acid casein) and, after swelling, the casein is dissolved by addition of 2 parts of ammonia of 25 per cent strength. Thereupon, 10 parts of urea of the formula:

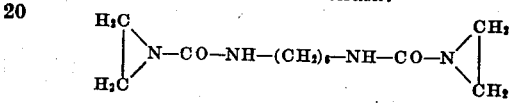

are added.

A plywood is prepared from 3 veneers of beech wood of 2 mm. thickness by coating both sides of the middle veneer with the solution of the adhesive, whereas the outside veneers are applied in the uncoated state. The composite panel is pressed for 10 minutes in a hydraulic press heated to 100° C. When test bodies are broken in order to ascertain the shearing strength according the prescriptions of the "Reichsausschuss für Lieferungsbedingungen" a resistance of the cementation of 34 kg./cm.² is obtained.

(6) Instead of 10 parts of the monomeric urea of Example 5 there are used 10 parts of the aqueous, partially polymerized urea of 50 per cent strength prepared according to Example 4. By proceeding according to Example 5, the same resistance to shearing is obtained as in this example.

We claim:

1. An adhesive composition comprising an aqueous alkaline solution of casein and the compound of the following formula:

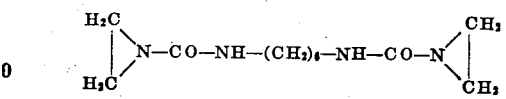

2. The process of uniting wood veneers which comprises coating a veneer with an aqueous solution of a partially polymerized urea having the formula

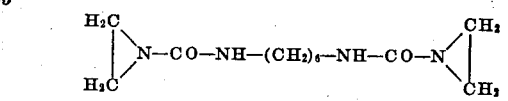

applying to the coated veneer other veneer sheets and subjecting the composite to heat and pressure to polymerize the urea.

HERBERT BESTIAN.
EUGEN BOCK.